United States Patent Office 3,310,516
Patented Mar. 21, 1967

3,310,516
ALCOHOL ADDITION SUBSEQUENT TO EMULSIFICATION
Gerardus E. La Heij and Jacques A. Waterman, Amsterdam, Netherlands, assignors to Shell Oil Company, New York, N.Y., a corporation of Delaware
No Drawing. Filed Jan. 27, 1964, Ser. No. 340,507
Claims priority, application Netherlands, Feb. 5, 1963, 288,571
6 Claims. (Cl. 260—29.7)

This invention relates to a process for the preparation of aqueous dispersions of certain polymeric materials. More particularly, the invention is concerned with the preparation of artificial latices.

If in preparing artificial latices, one fails to take special measures during or after emulsification, very troublesome foam formation occurs when the solvent is removed by way of the vapor phase even if the concentration of emulsifier is quite low. This is often accompanied by partial coagulation and frequently by the formation of "slime." By "slime" is meant a slimy mixture presumably consisting of a continuous solvent phase in which droplets of water are dispersed which contain polymer particles that have been only partially freed of solvent and hence are in a strongly swollen state. Moreover, if high emulsifier concentrations are not applied, the latices thus obtained are very coarse, which makes them unsuitable for being concentrated to what are called foam latices, from which foam rubbers can be manufactured. In addition, such coarse dispersions when concentrated do not produce latices that are suitable for dipping purposes. If this process is carried out with higher emulsifier concentrations or if pressure is reduced during the removal of the solvent, surface dehydration of the foam formed will further increase the losses due to coagulation and slime formation. The latices of non-rubber-like polymers, such as those of polystyrene or of styrene-butadiene copolymers with a high styrene content, can very suitable be mixed with foam rubber latices in order to prepare therefrom foam rubbers having improved mechanical properties.

Processes are known for the preparation of artificial latices from diene polymers or copolymers in which the emulsification of solutions of such polymers can be effected. For instance, they may be formed in the presence of organic oxygen compounds that are highly soluble in water such as readily water-soluble alcohols, ketones, or ethers. Under the conditions at which solvent is removed, the oxygen compounds previously used are generally completely miscible, at the emulsification temperature and pressure with the quantities of solvent used for the polymer and with water. The application of the aforesaid organic oxygen compounds was aimed at improving the emulsification step in the latex forming process. However, it was found that the addition of the water soluble oxygen compounds either prior to or during emulsification and at no later time, did not cure the problems of excessive foaming, coagulation or slime formation.

Applying equal emulsifier concentrations, the average particle size of the resultant latices is considerably smaller than when the processes are carried out in the absence of organic oxygen compounds, but not withstanding the reduced foam formation, the losses of coagulum are high. This is because coagulation is then caused by the comparatively large amount of highly water soluble organic oxygen compound that is needed even when the concentration of emulsifier is low, for supressing troublesome foam formation. It would be expected therefore, that if water soluble organic oxygen compounds were added after emulsification that the same disadvantages would still continue. Moreover, the aforementioned processes in which the organic oxygen compounds are added prior to or during emulsification are not sufficiently flexible because, on the one hand, enlargement of the latex particles through reduction of the emulsifier concentration does not permit a proportional reduction in the quantity of organic oxygen compounds and hence involves greater coagulum losses. On the other hand, reduction of particle size by raising the emulsifier content cannot be achieved without sacrificing the advantage of suppressing troublesome foam formation or without increasing the amount of organic oxygen compounds and hence also further increasing the coagulum losses. Because of this, the particle size is often too small for the preparation of good macro-molecular foam and too large for preparing latices of quality that is the most desirable for dipping purposes.

It is an object of the present invention to improve the process for latex formation. It is another object of the invention to supply an improved process for the preparation of latices without undue losses due to foaming or coagulation. Other objects will become apparent during the following detailed description of the invention.

Now, in accordance with the present invention, a process for the preparation of latices from polymers of vinylidene compounds and their hydrogenated products is provided wherein cements of said polymers are emulsified and, subsequent to emulsification the emulsions so formed are modified with 1–70% by volume based on the water phase of highly water soluble organic oxygen compounds having from 2–10 carbon atoms per molecule. In successfully practicing the invention, a number of conditions must be fulfilled. The organic oxygen compound is not only added subsequent to emulsification and is one having a high degree of water solubility, but is one which under the conditions for solvent removal does not have an acid reaction toward the water phase; in the quantity applied is completely miscible at the temperatures encountered during the latex forming process with the quantity of water present; contains from 2–10 carbon atoms per molecule.

If the whole quantity of water soluble organic oxygen compounds is not contacted with the cement and water phases until after emulsification has taken place, very small particle latices are produced even when low emulsifier concentrations are employed. The viscosity of such latices is relatively high. Such latices are, after concentration to a solids content of about 40–60% by weight, particularly suitable for use in dipping processes, for applying coatings of rubber-like polymers to articles in general and in particular for carpet backing, for tire cord dipping and impregnating textiles and paper.

If, however, a portion of the organic oxygen compounds is present prior to or during emulsification, one can according to the size and ratio of the portions applied during and after emulsification obtain latices whose particle size is the best for producing the foam latices, with the particular view to the production of foams of rubber like materials. The latices must then be concentrated to solids contents of more than about 55% by weight, for example to 65% by weight or more. Preferably, calculated on the water phase, the amount of water soluble organic oxygen compounds (having a solubility of at least 20 grams per hundred cc.'s of water at 30° C.) that is present during emulsification is 1–10% by volume and the amount applied after emulsification is 1–60% by volume.

As a rule, the emulsification takes place under normal temperature and pressure conditions, but in certain cases, it may be carried out at higher or lower temperatures or pressures.

The oxygen compounds useful for the present process includes especially alcohols having described minimum water solubility and containing from 2–10 carbon atoms; ketones, glycol ethers and glycol ether esters. Examples of suitable materials having from 2–10 carbon atoms per molecule and water solubility of at least 20 grams per 100 cc.'s of water at 30° C. includes ethyl alcohol, normal-propyl alcohol, isopropyl alcohol, tertiary-butyl alcohol, allyl alcohol, acetone, methyl ethyl ketone, ethylene glycol monomethyl ether, diethyl glycol monoethyl ether, ethylene glycol butyl ether, ethylene glycol monomethyl ether acetate and ethylene glycol monoethyl ether acetate.

Under certain circumstances, it may be advisable to perform the step of emulsification in the presence of water-soluble organic oxygen compounds having poor solubility, e.g., less than 20 grams per 100 cc.'s of water at 30° C. Thus, certain alcohols and ketones having this solubility requirement may be present at the time of emulsification as long as at least one of the highly water soluble oxygen compounds is added subsequent to emulsification.

In view of a potential risk of coagulation caused by addition of oxygen compounds, it is desirable but not always essential to previously dilute one volume of the water soluble oxygen compounds with 0.1–5 volumes of water prior to bringing the oxygen compound into contact with the pre-formed cement-water emulsion.

According to the viscosity of the desired cement from which the latex is to be produced, the concentration of the solutions to be emulsified may vary within fairly wide limits, for example, from about 3% by weight to 70% by weight of polymeric materials. As a rule, however, concentrations between 5 and 20% by weight are suitable. The solvents which can be used in the present process depend upon the solubility therein of the polymers and on the essential property that they be essentially immiscible with water. Suitable solvents include aliphatic, cycloaliphatic and aromatic hydrocarbons as well as non-hydrocarbons such as chloroform, carbon tetrachloride, carbon disulfide, ethers and others. Particularly suitable solvents for copolymers of alpha olefins are the liquid alkanes or isoalkanes having a boiling point below about 150° C. Polymeric dienes such as polyisoprene are suitably dissolved in solvents such as mixed pentenes or mixed pentanes, since polyisoprene is usually prepared in such a medium.

The process of the invention is of particular importance for the preparation of artificial latices from polymers of vinylidene compounds such as poly(alpha olefins), conjugated diene polymers such as poly butadiene, polyisoprene, polypiperylene, polychloroprene, copolymers of dienes with each other or with monovinyl aromatic compounds. Such copolymers include especially butadiene-styrene copolymers having a wide range of butadiene to styrene ratios. The process can be applied also to the preparation of latices of block copolymers, graft copolymers and the usual random copolymers as well as to hydrogenated products obtained from any of the varieties of polymers listed hereinabove. The best results are obtained with the process according to the invention if the ratio by volume of the sum of ploymeric material and solvent to the sum of water and emulsifying agent is between about 0.5 and 5.

Emulsification is generally carried out in intensively operating emulsification equipment such as high speed colloid mills with a turbo mixer fitted in the intake funnel and also planetary mixers provided with wall scrapers. Suitable emulsifying agents are ionic as well as non-ionic materials or mixtures thereof. Preferably, anionic emulsifiers are applied such as alkali or ammonium soaps of resin acids and/or fatty acids for example oleic acid, palmitic acid, stearic acid, lauric acid, myristic acid, etc. A very suitable emulsifier of this type is morpholine oleate.

Other suitable anionic emulsifiers are the alkali or ammonium soaps of branched carboxylic acids or of alkyl or aryl sulfuric acids, alkyl or aryl sulfonic acids as well as sulfated or sulfonated glycidyl esters of carboxylic acids.

Cationic emulsifiers are also suitable. In this group belong, for example, the quaternary ammonium salts such as tridecyl benzene or cetyl pyridinium bromide. It is also possible to use non-ionic emulsifiers such as, for example, phosphoric esters of higher alcohols and monoesters of oleic acid and pentaerythritol, sorbitan, monooleate, etc.

The emulsifiers may be added in several ways. For instance, to the water phase or the cement phase. Alternatively, the emulsifiers can be prepared in situ. During the emulsification, there is no objection normally to the presence in the dispersion of carbon black or other reinforcing or non-reinforcing solid fillers such as whites and certain resins such as phenol-formaldehyde resins.

The removal of solvent is effected in vapor phase preferably utilizing steam or other source of heat. Azeotropic distillation is normally utilized and it is during this stage of the process when foam formation can be troublesome. Consequently, the injection of the water-soluble oxygen compounds is made after emulsification but prior to removal of polymer solvent. The examples which follow hereinafter show the advantages gained by injecting the water soluble oxygen compounds at least in substantial part after emulsification has been completed. This is true with respect to both foaming and coagulum formation.

Ofter the presence of an antioxydant, for instance a sterically hindered phenol is desirable during the removal of organic oxygen compounds. Preferably anti-oxydants are used which are not or only slightly volatile with steam, e.g. 1,3,5 - trimethyl - 2,4,6 - tri(3,5 - ditert.butyl - 4 - hydroxybenzyl)benzene. The anti-oxydant can be added to the solution of the macromolecular substance before emulsification. The quantity of anti-oxydant may be for instance 0.01 to 1% w. calculated on macromolecular substance.

The latices obtained by the process according to the invention can be concentrated still further such as by centrifuging, creaming or addition of thickening agents or evaporation such as in a film evaporator. By one special method, the concentration of water soluble emulsifier in the latex is raised to 20–100% by weight of the polymer after which the unstable suspension obtained is allowed to segregate either spontaneously or otherwise with formation of a top layer that generally contains virtually all of the polymeric material in the form of a concentrated latex.

The following examples illustrate the advantages of the present invention:

*Example I*

A number of experiments were carried out in which solutions of a polyisoprene with a cis 1,4-content of 92.6% w. and an intrinsic viscosity of 7.4 were emulsified in water for 15 minutes. Use was made of a high-speed colloid mill with a turbomixer built in the intake funnel.

The solvent used was n-pentane or a technical mixture of amylenes, consisting chiefly of tertiary amylenes. In all the experiments the emulsifier applied was potassium oleate and the organic oxygen compounds were isopropyl alcohol (IPA). For comparison, in one of the experiments (No. 1) the total quantity of alcohol was added before emulsification. In the other experiments the process according to the invention was applied and the alcohol was admixed partly before and partly after emulsification. The total amount of alcohol, calculated on water phase (i.e., water plus alcohol) was invariably 20% by volume.

The quantity of isopropyl alcohol that was applied after emulsification was added as an aqueous solution of 50% by weight. The addition of alcohol after emulsification was invariably accompanied by or followed by only very moderate stirring. In all, the experiments, the ratio by volume of the sum of polymer plus solvent to the sum of water plus alcohol was equal to 1. The kind of solvent used, the polymer concentration of the solvent to be emulsified, the emulsifier concentration and the method of adding the alcohols, are shown in Table I.

The resultant emulsions were then completely freed of solvent and alcohol by steam stripping.

evenly distributed between 9,200 and 10,700 A., 10% w. varying between 10,700 and 13,000 A. and 5% w. increasing from 13,000 to 15,500 A., while the particles of the remaining 40% w. were all larger than 15,500 A. This latex was particularly suitable for the manufacture of foam rubber.

TABLE I

| Exp. No. | Solvent | Polymer Concentration of The Solution | | Emulsifier Concentration Calculated on Polymer, Percent w. | Type of Alcohol | Quantity of Alcohol Added, Calculated on Water Phase | | Quantity of Coagulum After Steam Treatment, Calc. on Polymer, Percent w. | Properties of the Concentrated Latex | | | | | | |
|---|---|---|---|---|---|---|---|---|---|---|---|---|---|---|---|
| | | | | | | | | | Surface Tension, Dyn/cm.² | Drage Viscosity, Centipoises | | | | | |
| | | | | | | | | | | Rotor φ 24 mm. | | | Rotor φ 29.5 mm. | | |
| | | Percent v. | Percent w. | | | Before Emulsification, Percent v. | After Emulsification, Percent v. | | | Number of Revolutions per Minute | | | | | |
| | | | | | | | | | | 20.5 | 64 | 200 | 20.5 | 64 | 200 |
| 1 | n-Pentane | 6.0 | 8.7 | 5 | IPA | 20 | 0 | 5 | 30 | 880 | 440 | 240 | 273 | 163 | |
| 2 | do | 6.5 | 9.4 | 4 | IPA | 10 | 10 | <1 | 30 | 510 | 297 | 186 | 201 | 131 | 97 |
| 3 | do | 6.0 | 8.7 | 5 | IPA | 5 | 15 | <1 | 30 | 1,660 | 785 | 420 | 509 | 280 | |
| 4 | do | 6.0 | 8.7 | 5 | IPA | 0 | 20 | <1 | 30 | 1,750 | 850 | 440 | 538 | 283 | |
| 5 | Amylenes | 5.0 | 7.4 | 5 | IPA | 10 | 10 | <1 | 29 | 269 | 180 | 117 | | | |

In the case where amylene was used as the solvent for polyisoprene, an amylene-isopropyl alcohol azeotrope boiling at 35–45° C. (ratio by vol. 98:2) was first expelled from which, after condensation, the isopropyl alcohol could be separated by simple extraction with water; then at 88–92° C., an isopropyl alcohol water azeotrope (ratio by vol. 63:37) passed over. In all the experiments, only an unstable foam was formed during the steam treatment, and this could easily be broken down by blowing in air. As is apparent from the table, the coagulum losses were negligible, except in experiment No. 1 wherein alcohol addition was not made subsequent to emulsification.

The latices thus obtained were concentrated by centrifuging them to a solids content of at least 60% w. For this purpose, use was made of a centrifuge with a speed of 20,000–22,000 revolutions per minute. The surface tension and the viscosity of the concentrated latices were determined. The viscosity measurements were carried out at 25° C. and a solids content of 60% w., the latices being diluted accordingly when necessary. The measurements were carried out using a standard graduated cup, the rotor (spindle) with a diameter of 24 mm. and the rotor with a diameter of 29.5 mm.; the speeds applied were 20.5, 64 and 200 r.p.m. The results are presented in Table I.

In Experiment 1, too much coagulum was formed and the latex produced was not attractive either for the manufacture of foam rubber or for application in dipping processes.

The latex of Experiment 2 was suitable for the manufacture of foam rubber, while Experiments 3 and 4 produced dispersions that could very well be used as dipping latex.

Of the latex obtained in Experiment No. 5 the particle size distribution was determined; about 20% w. of the latex was of a size evenly distributed between 4,000 A. and 7,000 A., about 20% w. having a size that increased gradually from 7,000 to 9,200 A., about 10% w. being

*Example II*

A number of experiments were carried out using 14% w. solutions in n-hexane of a terpolymer containing 60% w. of ethene, the rest being propene and as much as dicyclopentadiene as to make 4.3 double bonds per 1,000 carbon atoms. The terpolymer had an intrinsic viscosity of 1.6 and a Mooney viscosity of 51. The content of liquid polymers was 5% w. and 1 gram of the terpolymer dissolved completely in 150 milliliters of hexane at normal temperature within 3 hours.

The ratio by volume of the sum of solvent plus polymer to the sum of water plus isopropyl alcohol was 1.43. To this end 50 parts by volume of water to 100 parts by volume of polymer solution and a total of 28.6 parts by volume of isopropyl alcohol to 100 parts by volume of water/alcohol mixture were invariably used. In other respects, emulsification was effected in the same way as described in Example I. In removing the solvent and the isopropyl alcohol with steam an azeotrope was first formed of n-hexane and isopropyl alcohol, which distilled at 60–65° C. and of which the isopropyl alcohol content amounted to 23% w. Then, at 88–92° C., an azeotropic mixture of isopropyl alcohol and water, the composition of which is described in Example I, was steam-stripped. The latices thus produced all had a mechanical stability of more than 30 minutes as measured by the specifications of ASTM No. 1076–59. All the latices thus obtained had a pH of 9.4 to 9.5. The surface tensions and particle sizes are shown in Table II. For concentrating the latices use was made of a film evaporator consisting of a horizontally rotating glass cylinder, the surface of which was heated by means of an air stream of about 60° C. Concentration was continued to a solids content of 55% w., after which the viscosity of these concentrated latices was determined at 25° C. Results and other data are also given in Table II.

The concentrated latices of Experiments 9 and 10 were very suitable for application in dipping processes, in particular the latex of Experiment 10. In Experiments 7 and 8, which were not carried out in accordance with the process according to the invention, the coagulum losses were unduly high.

TABLE II

| Exp. No. | Quantity of Alcohol Added, Calculated on Water Phase | | Quantity of Potassium, Oleate, Calculated on Polymer, Percent w. | Quantity of Coagulum After Steam Treatment, Calc. on Polymer, Percent wt. | Properties of the Latex | | | | | | | |
|---|---|---|---|---|---|---|---|---|---|---|---|---|
| | Before Emulsification, percent v. | After Emulsification, percent v. | | | Surface Tension, Dyn/cm.² | Average Particle Size, A. | Viscosity, Centipoises of the 55% w. Latex | | | | | |
| | | | | | | | Rotor φ 24 mm. | | | Rotor φ 29.5 mm. | | |
| | | | | | | | Number of Revolutions per Minute | | | | | |
| | | | | | | | 20.5 | 64 | 200 | 20.5 | 64 | 200 |
| 7 | 28.6 | 0 | 10 | 2 | 28 | ---------- | 1,350 | 653 | 250 | 327 | 161 | 80 |
| 8 | 28.6 | 0 | 7.5 | 3 | 29 | 3,720 | 590 | 250 | 125 | 157 | 81 | 50 |
| 9 | 14.3 | 14.3 | 7.5 | 0 | 30 | 3,800 | 500 | 225 | 183 | ----- | ----- | ----- |
| 10 | 0 | 28.6 | 7.5 | <1 | 29 | 2,500 | 800 | 470 | 190 | 240 | 130 | 70 |

We claim as our invention:

1. In the process for preparing a latex wherein 1 volume of a solution of a polymer of the group consisting of poly(alphaolefins), conjugated diene homopolymers, copolymers of conjugated dienes with monovinyl aromatic compounds, and hydrogenated polymers of the foregoing in a hydrocarbon solvent is emulsified by intense agitation with 0.5–5 volumes of an aqueous phase comprising water and an emulsifying amount of an emulsifying agent, solvent is removed therefrom and latex is recovered, the improvement consisting essentially of adding to the emulsion, subsequent to emulsification, 10 to 70% by volume as the sole water-miscible modifier based on the aqueous phase, of an aliphatic alcohol having 2–4 carbon atoms per molecule and having a water solubility of at least 20 grams per 100 cc. $H_2O$ at 30° C.

2. A process according to claim 1 wherein 1%–10% by volume based on the aqueous phase of the recited aliphatic alcohol is present during the emulsification step and 10–60% by volume of alcohol is added subsequent to emulsification.

3. A process according to claim 1 wherein each volume of the alcohol is diluted with 0.1–5 volumes of water prior to mixing with the emulsion.

4. A process according to claim 1 wherein the polymer is a polymerized conjugated diene.

5. A process according to claim 4 wherein the polymer is polyisoprene.

6. A process according to claim 1 wherein the alcohol is isopropyl alcohol.

References Cited by the Examiner

UNITED STATES PATENTS 2,799,662  7/1957  Ernst et al. _____ 260—29.7
2,953,556  9/1960  Wolfe et al. _____ 260—29.7

MURRAY TILLMAN, *Primary Examiner.*

J. ZIEGLER, *Assistant Examiner.*